(12) United States Patent
Takahashi et al.

(10) Patent No.: US 10,787,039 B2
(45) Date of Patent: Sep. 29, 2020

(54) MOTORCYCLE TIRE

(71) Applicant: BRIDGESTONE CORPORATION, Tokyo (JP)

(72) Inventors: Junichi Takahashi, Tokyo (JP); Mitsunori Uchida, Tokyo (JP)

(73) Assignee: BRIDGESTONE CORPORATION, Chuo-ku, Tokyo (JP)

(*) Notice: Subject to any disclaimer, the term of this patent is extended or adjusted under 35 U.S.C. 154(b) by 220 days.

(21) Appl. No.: 15/514,132

(22) PCT Filed: Jun. 8, 2015

(86) PCT No.: PCT/JP2015/066454
§ 371 (c)(1),
(2) Date: Mar. 24, 2017

(87) PCT Pub. No.: WO2016/047213
PCT Pub. Date: Mar. 31, 2016

(65) Prior Publication Data
US 2017/0291455 A1    Oct. 12, 2017

(30) Foreign Application Priority Data

Sep. 26, 2014   (JP) ................................ 2014-197450

(51) Int. Cl.
*B60C 11/03* (2006.01)
*B60C 11/12* (2006.01)
(52) U.S. Cl.
CPC ...... *B60C 11/0323* (2013.01); *B60C 11/0302* (2013.01); *B60C 11/032* (2013.01);
(Continued)
(58) Field of Classification Search
CPC .......................... B60C 11/0302; B60C 11/032
See application file for complete search history.

(56) References Cited

U.S. PATENT DOCUMENTS

| | | | |
|---|---|---|---|
| 6,220,320 B1* | 4/2001 | Nakagawa | .......... B60C 11/0302 |
| | | | 152/209.11 |
| 2012/0285593 A1 | 11/2012 | Mariani et al. | |
| 2014/0360637 A1* | 12/2014 | Nakagawa | ............ B60C 11/032 |
| | | | 152/209.11 |

FOREIGN PATENT DOCUMENTS

| | | | |
|---|---|---|---|
| JP | 03-135802 A | * | 6/1991 |
| JP | 04-254205 A | | 9/1992 |

(Continued)

OTHER PUBLICATIONS

Machine translation for Japan 2011-189805 (Year: 2018).*

(Continued)

*Primary Examiner* — Steven D Maki
(74) *Attorney, Agent, or Firm* — Sughrue Mion, PLLC

(57) ABSTRACT

Provided is a motorcycle tire having improved wet performance during straight running without compromising other performances. The motorcycle tire is a motorcycle tire whose rotation direction when mounted on a vehicle is designated. A main groove (10) at least including a first groove (11) and a second groove (12) having different inclination directions, and a sub groove (20) are provided on a tire tread, the main groove and the sub groove are alternately repeatedly formed in the tire circumferential direction line symmetrically with respect to the tire equator and are arranged offset in the tire circumferential direction between one side and the other side in the tire width direction, and the main groove and the sub groove include, per one pitch of pattern on one side in the tire width direction within the contact region S during straight running, two or more outward grooves extending obliquely from the tire equator side to the outside in the tire width direction toward the designated reverse rotation direction of the rotation direction and one or more inward grooves extending obliquely from the outside in the tire width direction to the (Continued)

tire equator side toward the designated reverse rotation direction of the rotation direction.

4 Claims, 2 Drawing Sheets

(52) U.S. Cl.
CPC .......... *B60C 11/0304* (2013.01); *B60C 11/12* (2013.01); *B60C 2011/0372* (2013.01); *B60C 2011/0374* (2013.01); *B60C 2200/10* (2013.01)

(56) References Cited

FOREIGN PATENT DOCUMENTS

| | | | |
|---|---|---|---|
| JP | 2011-189805 A | * | 9/2011 |
| JP | 2011-189805 A | | 9/2011 |
| JP | 1441963 S | | 5/2012 |
| JP | 2012-153318 A | | 8/2012 |
| JP | 2013-515646 A | | 5/2013 |
| WO | 2013/121945 A1 | | 8/2013 |
| WO | WO-2013/121945 A1 | * | 8/2013 |

OTHER PUBLICATIONS

Machine translation for Japan 03-135802 (Year: 2019).*
International Search Report of PCT/JP2015/066454 dated Aug. 11, 2015.

* cited by examiner

MOTORCYCLE TIRE

TECHNICAL FIELD

The present invention relates to a motorcycle tire (hereinafter, also simply referred to as "tire"), and particularly to a motorcycle tire relating to improvement of an arrangement condition of a groove provided in a tire tread.

BACKGROUND ART

A motorcycle tire is greatly characterized in that a region of a tire tread which is used is different between when a vehicle runs straight and when it turns. Specifically, in a motorcycle tire, it is general that a tread midsection is mainly grounded during straight running, and a tread shoulder portion is grounded during turning.

As a conventional art relating to a motorcycle tire, for example, Patent Document 1 discloses a motorcycle pneumatic tire in which a tire tread is provided with a bent main groove composed of a first groove extending toward the designated tire rotation direction inclined outside in the tire width direction in a contact region during straight running; a second groove extending from the end portion in the reverse rotation direction of the designated tire rotation direction of the first groove in the reverse rotation direction of the designated tire rotation direction inclined outside in the tire width direction; and a third groove extending from the end portion in the reverse rotation direction of the designated tire rotation direction of the second groove in the reverse rotation direction of the designated tire rotation direction inclined outside in the tire width direction, and the bent main groove is formed such that an inclination angle $\theta_3$ with respect to the tire circumferential direction of the third groove is larger than an inclination angle $\theta_2$ with respect to the tire circumferential direction of the second groove.

RELATED ART DOCUMENT

Patent Document

Patent Document 1: WO2013/121945

SUMMARY OF THE INVENTION

Problems to be Solved by the Invention

According to the technique disclosed in the above-described PATENT DOCUMENT 1, a pneumatic motorcycle tire in which, without compromising the stability during running, other performances such as light-weight, grip performance, and wet performance are improved can be obtained. However, with the increasing demand for further improvement in performance, it has been desired to realize a more improved tire, particularly with respect to wet performance during straight running.

Accordingly, an object of the present invention is to provide a motorcycle tire having improved wet performance during straight running without compromising other performances.

Means for Solving the Problems

Due to the characteristics of a motorcycle as described above, the groove arrangement in the vicinity of the center in the tire width direction across the tire equator greatly affects the tire performance during straight running. From such a viewpoint, the present inventors intensively studied to find that the above problems can be solved by the following constitution, thereby completing the present invention.

Specifically, the present invention is a motorcycle tire whose rotation direction when mounted on a vehicle is designated, wherein a main groove at least including a first groove and a second groove having different inclination directions, and a sub groove are provided on a tire tread, the main groove and the sub groove are alternately repeatedly formed in the tire circumferential direction line symmetrically with respect to the tire equator and are arranged offset in the tire circumferential direction between one side and the other side in the tire width direction, and the main groove and the sub groove include, per one pitch of pattern on one side in the tire width direction within the contact region during straight running, two or more outward grooves extending obliquely from the tire equator side to the outside in the tire width direction toward the designated reverse rotation direction of the rotation direction and one or more inward grooves extending obliquely from the outside in the tire width direction to the tire equator side toward the designated reverse rotation direction of the rotation direction.

In the tire of the present invention, preferably, the main groove and the sub groove include two or more of the outward grooves and one or more of the inward grooves in a contact surface that is grounded during straight running at any part in the tire circumferential direction. In the tire of the present invention, preferably, the first groove is the inward groove, the slab groove is the outward groove, the ratio [(length of an overlapped portion in the circumferential direction (mm)/length of the first groove in the tire circumferential direction (mm))×100(%)] of the overlapping portion in the tire circumferential direction between the first groove and the sub groove in the length of the first groove is 25 to 75%.

Further, in the tire of the present invention, preferably, the angle $\theta_1$ on the acute angle side formed by the extending direction of the first groove and the tire circumferential direction is 20 to 40 degrees, the angle $\theta_2$ on the acute angle side formed by the extending direction of the second groove and the tire circumferential direction is 20 to 40 degrees, and the angle $\theta_S$ on the acute angle side formed by the extending direction of a portion included in a contact region during straight running in the sub groove and the tire circumferential direction is 20 to 40 degrees.

Here, in the present invention, "contact surface during straight running" and "contact region during straight running" refer to a contact surface of a tire and a region to be a contact surface of a tire in a state in which the tire is mounted on a rim defined by an industrial standard that is effective in an area where the tire is produced and used and filled to an internal pressure defined in such an industrial standard, and the tire is caused to run straight under a defined load. The above-described industrial standard is JATMA (Japan Automobile Tire Association) YEAR BOOK in Japan, ETRTO (European Tire and Rim Technical Organization) STANDARD MANUAL in Europe, TRA (THE TIRE and RIM ASSOCIATION INC.) YEAR BOOK in the USA, or the like. Further, the designated tire rotation direction refers to a direction designated in the tire rotation direction when a tire is mounted on a vehicle, and is the direction of an arrow in FIG. 1. On the other hand, the reverse rotation direction refers to a reverse direction when the designated tire rotation direction is a forward direction.

Effects of the Invention

According to the present invention, it becomes possible to realize a motorcycle tire having improved wet performance during straight running without compromising other performances.

MODE FOR CARRYING OUT THE INVENTION

Hereinafter, embodiments of the present invention will be described in detail with reference to the drawings.

Figure 1:
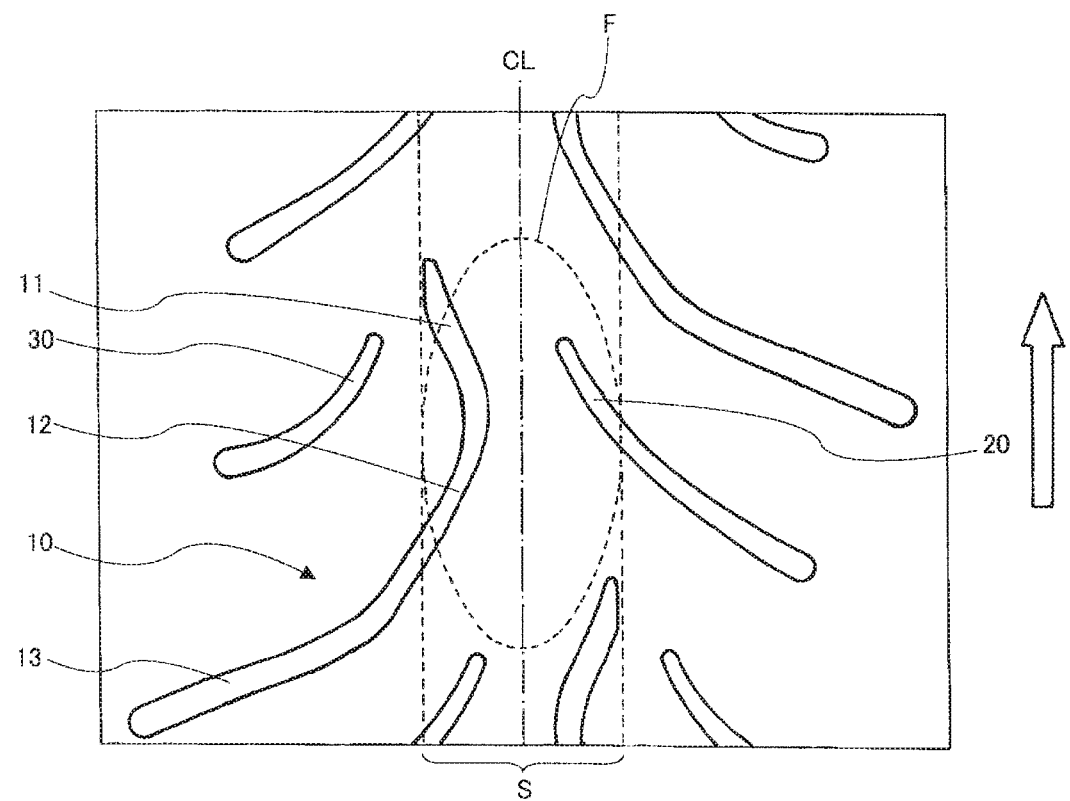
FIG. 1 is a partially developed view illustrating a tread of one example of a motorcycle tire of the present invention.
Figure 2:
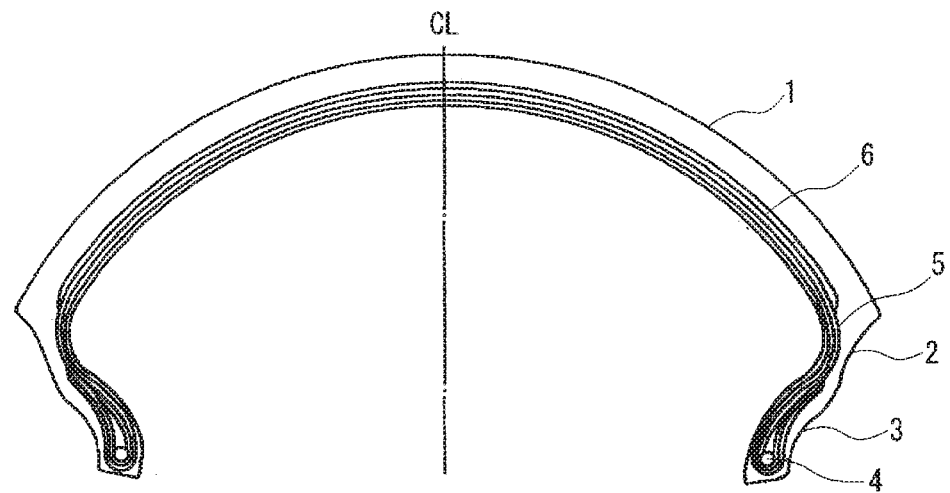
FIG. 2 is a schematic cross-sectional view illustrating an example of a motorcycle tire of the present invention.

FIG. 1 is a partially developed view illustrating a tread of one example of a motorcycle tire of the present invention. FIG. 2 is a schematic sectional view illustrating one example of a motorcycle tire of the present invention. As illustrated in FIG. 1 and FIG. 2, a motorcycle tire of the present invention comprises a tread portion 1, a sidewall portion 2 and a bead portion 3 which are sequentially connected to both sides thereof, and has a so-called directional pattern in which the direction of rotation when mounted on a vehicle is designated. The arrow in FIG. 1 indicates a rotation direction (designated rotation direction) when mounted on a vehicle.

As illustrated in FIG. 1, the tire of the present invention comprises a main groove 10 including at least a first groove 11 and a second groove 12 having different inclination directions on a tire tread, and a sub groove 20, and the main groove 10 and the sub groove 20 are alternately and repeatedly formed in the tire circumferential direction line symmetrically with respect to the tire equator CL, and are arranged offset in the tire circumferential direction between one side and the other side in the tire width direction.

The present invention is characterized in that the main groove 10 and the sub groove 20 include, per one pitch of pattern on one side in the tire width direction within a contact region S during straight running, two or more, for example, two to four outward grooves extending obliquely from the tire equator side to the outside in the tire width direction toward the designated reverse rotation direction of the rotation direction and one or more, for example, one to two inward grooves extending obliquely from the outside in the tire width direction to the tire equator side toward the designated reverse rotation direction of the rotation direction. Here, in the present invention, it is assumed that a groove is included in the contact region S as long as there is any slight groove in the contact region S during straight running. In the illustrated example, the main groove 10 and the sub groove 20 include the second groove 12 and the sub groove 20 as two outward grooves and the first groove 11 as one inward groove per one pitch of pattern for a region on the right side in the tire width direction in the contact region S during straight running.

Here, in the present invention, the term "one pitch of pattern" means a repeating unit in a tire circumferential direction of a pattern formed by grooves provided on a tire tread. In the present invention, even when a groove shape has a bent portion, a groove portion inclined from the tire equator side to the outside in the tire width direction as the whole groove is counted as one outward groove, and similarly, a groove portion inclined from the outside in the tire width direction to the tire equator side as the whole groove is counted as one inward groove.

In the present invention, by arranging two or more outward grooves and one or more inward grooves in the contact region S in the tire tread, drainage during straight running can be greatly improved as compared with a conventional one. This is due to the following reason. Specifically, since the second groove 12 and the sub groove 20 which are outward grooves are inclined in a direction substantially parallel to the contour of a contact surface on the trailing side, water is taken into the grooves when stepping on, while the grooves have a function to prevent water from overflowing from the inside of the groove by increasing a ground contact pressure near a ground contact end when trailing. Since the first groove 11 which is an inward groove is inclined in a direction substantially parallel to the contour of a contact surface on the stepping-on side, by raising a pressure near the ground contact end when stepping on, the groove has a function to suppress entry of water into the grooves in the first place while promoting drainage from the inside of the grooves when trailing. Originally, the function of the outward grooves is more important in a motorcycle tire with a small contact area, and therefore, in the present invention, by arranging two or more outward grooves and arranging one or more inward grooves, it becomes possible to effectively improve wet performance during straight running.

In the present invention, preferably, the main groove 10 and the sub groove 20 include two or more, for example, two to four outward grooves and one or more, for example, one to two inward grooves in a contact surface F which is grounded during straight running at any part in the tire circumferential direction. For example, the illustrated contact surface F includes the second groove 12 and the sub groove 20 as two outward grooves and a first groove 11 as one inward groove. As a result, drainage in the contact surface can always be ensured during straight running, and therefore, the wet performance during straight running can be more surely improved. Here, in the present invention, as long as there is any slight groove in the contact surface F during straight running, a groove is included in the contact surface F. The number of outward grooves and inward grooves included in the contact surface F can be adjusted by appropriately selecting the arrangement pitch of the main groove and the sub groove and the offset amount of the left and right patterns.

Further, in the tire of the present invention, as illustrated, preferably, along with rotation of a tire, three grooves which are substantially parallel to each other in the contact region S during straight running appear alternately in the left and right direction in an inclination direction with respect to the tire circumferential direction. By the appearance of three grooves which are substantially parallel to each other, it is possible to regulate the flow of water at the time of trailing and to inhibit flow returning to the inside of the contact surface, and as a result, an effect of improving the wet performance during straight running can be obtained. Specifically, the tire of the present invention has two types of grooves in which the inclination direction with respect to the tire circumferential direction is different in the left and the right in the contact region S during straight running, i.e., a groove (hereinafter, simply referred to as "upper left direction") extending from the upper left to the lower right and a groove (hereinafter, simply referred to as "upper right direction") extending from the upper right to the lower left. Although depending on the shape of the contact surface F, along with rotation of a tire, six grooves, namely, an upper left outward groove, an upper leftward outward groove, an upper left inward groove, an upper right outward groove, an upper right outward groove, and an upper right inward groove appear sequentially in the contact surface F. More specifically, in the tire of the present invention, within the contact region S during straight running, Combination 1 of an upper left direction outward groove, an upper left direction outward groove, and an upper left direction inward groove, Combination 2 of an upper left direction outward groove, an upper left direction inward groove, and an upper right direction outward groove, Combination 3 of an upper left direction inward groove, an upper right direction outward groove, and an upper right direction outward groove, Combination 4 of an upper right direction outward groove, an upper right direction outward groove, and an upper right direction inward groove, Combination 5 of an upper right direction outward groove, an upper right direction inward groove, and an upper left direction outward groove, and Combination 6 of an upper right direction inward groove, an upper left direction outward groove, and an upper left direction outward groove appear sequentially, and in the case of Combinations 1 and 4, the three grooves are substantially parallel to each other, and in the case of Combinations 2, 3, 5, and 6, two grooves are substantially parallel to each other.

Figure 3:
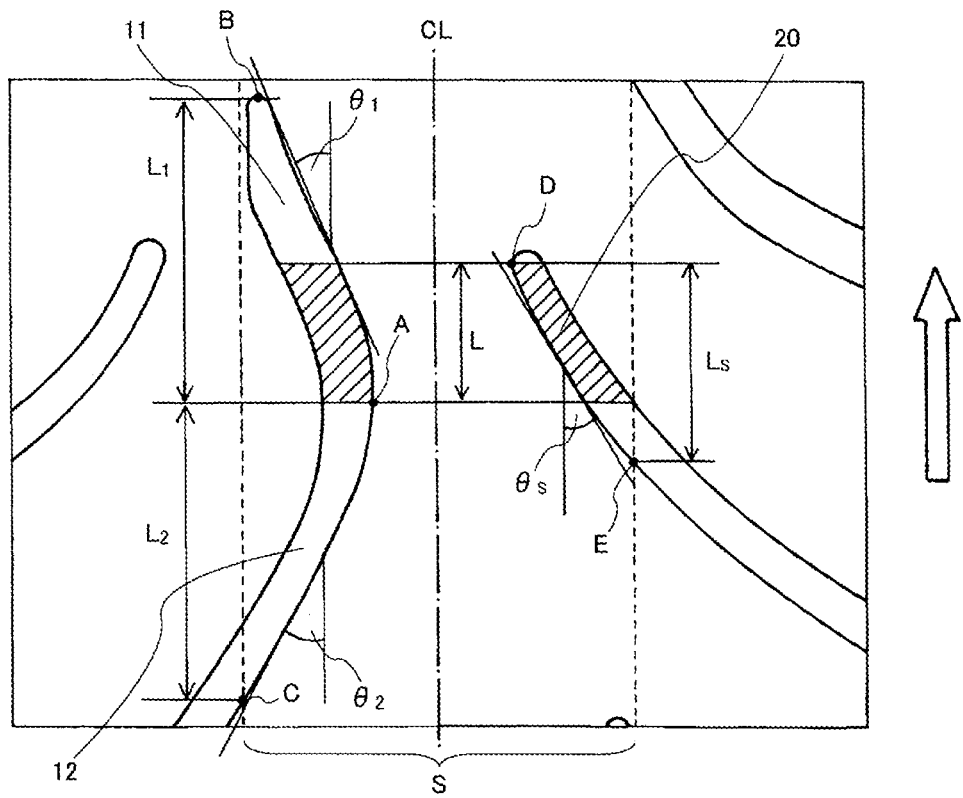
FIG. 3 is a partially enlarged view of the tread illustrated in FIG. 1 in the vicinity of the tire equatorial plane.

FIG. 3 illustrates a partial enlarged view of the tread illustrated in FIG. 1 in the vicinity of the tire equatorial plane. In the present invention, preferably, as illustrated in the drawing, the first groove 11 is an inward groove, the sub groove 20 is an outward groove. The ratio [(length in the tire circumferential direction L (mm) of the overlapped portion/length in the tire circumferential direction $L_1$ (mm) of the first groove×100(%)] of an overlap portion (hatched portion in the drawing) in the tire circumferential direction between the first groove 11 and the sub groove 20 in the length $L_1$ of the first groove 11 is 25 to 75%. Whether the ratio of the overlapping portion in the tire circumferential direction between the first groove 11 and the sub groove 20 is below or above the above-described range, the rigidity balance in a contact surface tends to deteriorate, which is undesirable because the steering performance during straight running deteriorates.

Here, in the present invention, the length of a groove means a distance in the tire circumferential direction from a point where the distance to the tire equator becomes the minimum at an inner side edge portion in the tire width direction of each groove to the end point in the tire circumferential direction of the groove in a contact region. Therefore, in the illustrated example, the length of the first groove 11 is the tire circumferential direction distance $L_1$ from the point A to the point B, the length of the second groove 12 is the tire circumferential distance $L_2$ from the point A to the point C, and the length of the sub groove 20 is the tire circumferential direction distance $L_S$ from the point D to the point E.

In the present invention, preferably, the angle $\theta_1$ on the acute angle side formed by the extending direction of the first groove 11 and the tire circumferential direction is 20 to 40 degrees, the angle $\theta_2$ on the acute angle side formed by the extending direction of the second groove 12 and the tire circumferential direction is 20 to 40 degrees, and the angle $\theta_S$ on the acute angle side formed by the extending direction of the sub groove 20 of the portion included in the contact region S during straight running and the circumferential direction of the tire is 20 to 40 degrees. As described above, by arranging each groove at such an angle, the inclination direction of each groove and the contour of a contact surface at the time of stepping-on or trailing are nearly parallel, and therefore, an effect of improving drainage performance during straight running can be more reliably obtained. Here, in the present invention, the extending direction of a groove means a tangential direction of an inner side edge portion in the tire width direction of the groove at the midpoint of the length of the groove.

In the present invention, specific shapes of the main groove 10 and the sub groove 20 are not particularly limited as long as they can satisfy conditions relating to the outward grooves and the inward grooves. While, in the illustrated example, the main groove 10 is composed of the first groove 11 existing in the contact region S, the second groove 12 extending from the inside to the outside of the contact region S, and the third groove 13 existing outside the contact region S, in the present invention, the main groove 10 may be composed of the first groove 11 and the second groove 12 and not including the third groove 13. In this case, the third groove 13 may be provided as a groove separate from the main groove 10. From the viewpoint of obtaining a noise reduction effect, it is preferable that the connecting portions of the first to third grooves are formed in a curved shape as illustrated in the drawing. Further, as illustrated in the drawing, it is preferable that the second grooves 12 and the sub grooves 20 which are outward grooves extend from the inside of the contact region S to the outside of the contact region S because the drainage is further improved.

As illustrated in the drawing, preferably, the third groove 13 is provided with an inclination angle such that its extending direction is closer to the tire width direction than the second groove 12. By arranging the third groove 13 having an inclination angle closer to the tire width direction along an input at the time of turning in a tread shoulder portion closer to the outer side in the tire width direction as a contact region at the time of turning of a vehicle, deformation of a land portion due to an external force is suppressed at the time of turning of the vehicle and a contact surface is secured, and therefore, the running performance against a lateral force can be improved. Similarly to a tread center portion, drainage in this area can also be improved. When a groove in the same direction as the tread center portion is disposed on a tread shoulder portion on the extension line of the groove arranged in the tread center portion, the groove direction does not follow a lateral force, and therefore, a desired grip performance can not be obtained.

Further, in the present invention, an auxiliary groove can be appropriately arranged in addition to the main groove 10. In the illustrated tire, an auxiliary groove 30 extending obliquely from the tire equator side to the outside in the tire width direction in the reverse rotation direction of a designated rotation direction is further arranged outside the contact region S. Further, in the present invention, as illustrated in the drawing, from the viewpoint of securing adequate pattern rigidity in the vicinity of the tire equator and improving wear resistance, it is preferable not to arrange a groove on the tire equator.

Although the arrangement pitch of the main groove 10 and the sub groove 20 in the present invention is not particularly limited, it can be, for example, about 1/20 to 1/30 of the entire circumferential length of a tire. In the present invention, the positions of the main groove 10 and the sub groove 20 in the tire circumferential direction can be arranged alternately on one side and the other side of the tread portion surface sandwiching the tire equatorial plane CL, i.e., shifted by ½ to ⅓ of the arrangement pitch.

In the tire of the present invention, only to satisfy conditions related to the tread pattern is important. By this, an expected effect of the present invention can be obtained, and details of other tire structures and materials of each member are not particularly limited.

For example, the tire of the present invention comprises a carcass 5 arranged between bead cores 4 embedded in a pair of bead portions 3 to reinforce each portion and a belt 6 arranged on the outer periphery thereof to reinforce the tread portion 1. Such a belt 6 may be composed of two or more inclined belt layers arranged in such a way that the code directions cross each other between layers, or may be composed of one or more spiral belt layers whose cord directions are substantially in the tire circumferential direction. The present invention is useful as a rear tire for a motorcycle, and can be applied to both a tire having a radial structure and a tire having a bias structure.

EXAMPLES

Hereinafter, the present invention will be described in more detail by way of examples.

Example 1

In the tire size 180/55ZR17M/C, a test tire of Example 1 having a pattern (12 pitches in the entire circumference) illustrated in FIG. 1 and having a cross sectional structure (carcass ply: made of nylon, belt: steel monospiral belt) as illustrated in FIG. 2 was manufactured. In this pattern, a main groove and a sub groove included two outward grooves extending obliquely from the tire equator side to the outside in the tire width direction toward the reverse rotation direction of a designated rotation direction (a second groove and a sub groove) and one inward groove extending obliquely from the outside in the tire width direction to the tire equator side toward the reverse rotation direction of a designated rotation direction (a first groove) per one pitch of pattern on the right side in the tire width direction in a contact region during straight running. In this pattern, a main groove and a sub groove were offset by ½ pitch on both sides in the tire width direction sandwiching the tire equator, and included two outward grooves and one inward groove in a contact surface to be grounded during straight running at any portion in the tire circumferential direction. Further, the ratio [(length of an overlapped portion in the circumferential direction (mm)/length of the first groove in the tire circumferential direction (mm))×100(%)] of an overlapping portion in the tire circumferential direction between the first groove and the sub groove in the length of the first groove was 44%.

Still further, in this pattern, an angle $\theta_1$ on the acute angle side formed by the extending direction of the first groove and the tire circumferential direction was 25°, an angle $\theta_2$ on the acute angle side formed by the extending direction of the second groove and the tire circumferential direction was 28 degrees, an angle $\theta_S$ on the acute angle side formed by the extending direction of the sub groove of a portion included in a contact region during straight running and the circumferential direction of the tire was 30 degrees. Still further, in this pattern, the length in the tread circumferential direction of the main groove was 73% of one pitch length, the length in the tread circumferential direction of the sub groove was 40% of one pitch length, and the negative rate was 9.3%.

Conventional Example 1

Figure 4:
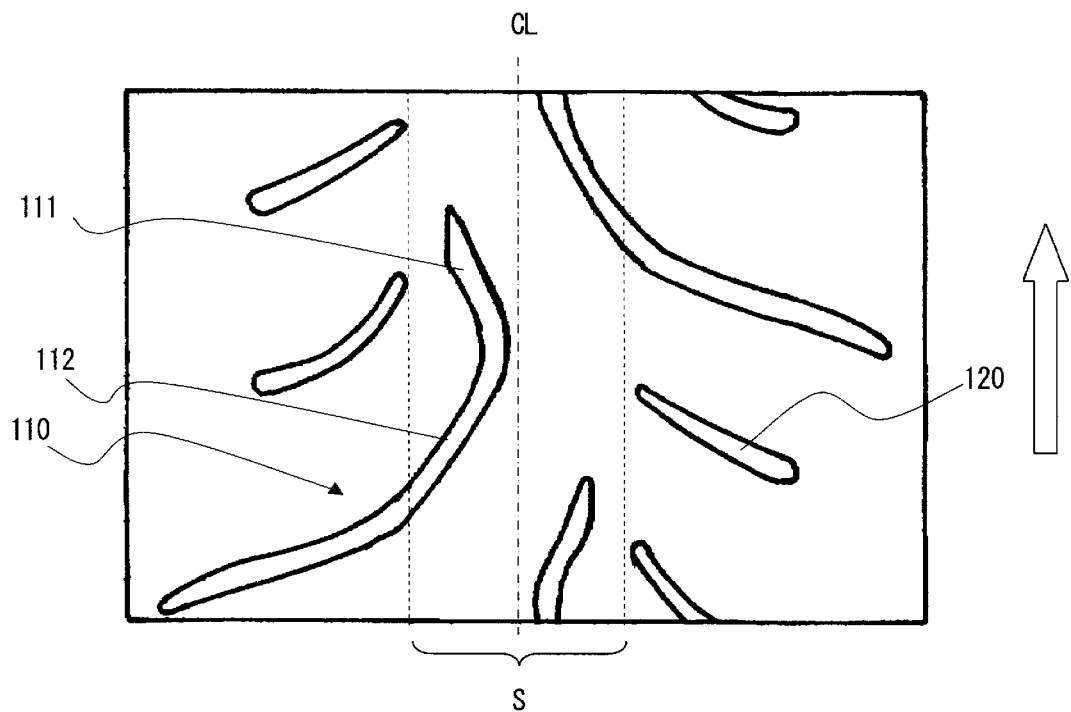
FIG. 4 is a partially developed view illustrating a tread of a conventional motorcycle tire.

A test tire of Conventional Example 1 was manufactured in the same manner as in Example 1 except that the pattern illustrated in FIG. 4 (12 pitches in the entire circumference) was used in place of the pattern illustrated in FIG. 1. In this pattern, the sub groove 120 did not exist within the contact region S during straight running, and the main groove 110 included one outward groove extending obliquely from the tire equator side to the outside in the tire width direction toward the reverse rotation direction of a designated rotation direction (a second groove 112) and one inward groove extending obliquely from the outside in the tire width direction to the tire equator side toward the reverse rotation direction of a designated rotation direction (a first groove 111) per one pitch of pattern on one side in the tire width direction in the contact region S during straight running. In this pattern, a main groove and a sub groove were offset by ½ pitch on both sides in the tire width direction sandwiching the tire equator, and included one outward groove and one inward groove in a contact surface to be grounded during straight running at any portion in the tire circumferential direction.

Further, in this pattern, the angle $\theta_1$ of the first groove, the angle $\theta_2$ of the second move, the angle $\theta_S$ of the sub groove and the circumferential length of the main groove in the tread circumferential direction were the same as in Example 1, the length in the tread circumferential direction of the sub groove was 17% of one pitch length, and the negative rate was 8.4%.

<Wet Performance During Straight Running>

Each test tire was mounted on a rim with a rim size of MT5.50×17M/C, filled with an internal pressure of 290 kPa, and mounted on a rear wheel of a 1250 cc test motorcycle. The test motorcycle was run on a wet road by a test rider, and acceleration/braking performance during straight running was evaluated by feeling evaluation. For a front wheel, a general purpose tire with a tire size of 120/70ZR17M/C was used. A rating of 10 points is taken as a full score, and a larger numerical value indicates better performance.

TABLE 1

| | Pattern | The number of grooves in contact surface | Wet performance during straight running (rating) |
|---|---|---|---|
| Example 1 | FIG. 1 | 3 | 7.8 |
| Conventional Example 1 | FIG. 4 | 2 | 6.5 |

As illustrated in the above table, in the test tire of Example 1 having the pattern illustrated in FIG. 1, as compared with the test tire of Conventional Example 1 of FIG. 4, it is obvious that the wet performance during straight running was greatly improved.

<Steering Performance During Straight Running>

Each test tire was mounted on a rim with a rim size of MT5.50×17M/C, filled with an internal pressure of 290 kPa, and mounted on a rear wheel of a 1250 cc test motorcycle. The test motorcycle was run on a dry road by a test rider, and steering performance during straight running was evaluated by feeling evaluation. For a front wheel, a general purpose tire with a tire size of 120/70ZR17M/C was used. A rating of 10 points is taken as a full score, and a larger numerical value indicates better performance.

TABLE 2

| | Overlapping amount in tire circumferential direction (%) | Steering performance during straight running (rating) |
|---|---|---|
| Example 1 | 44 | 8.5 |

As listed on the above table, it was confirmed that, by setting the ratio of the overlapping amount in the tire circumferential direction between the first groove and the sub groove to a predetermined range, the steering performance during straight running can be further improved.

DESCRIPTION OF SYMBOLS 1 tread portion
2 side wall portion
3 bead portion
4 bead core
5 carcass
6 belt
10, 110 main groove
11, 111 first groove
12, 112 second groove
13 third groove
20, 120 sub groove
30 auxiliary groove

The invention claimed is:

1. A motorcycle tire whose rotation direction when mounted on a vehicle is designated, wherein
a main groove at least including a first groove and a second groove having different inclination directions and a third groove with a smaller inclination angle with respect to a tire width direction than the second groove, and a sub groove are provided on a tire tread,
the main groove and the sub groove are alternately repeatedly formed in the tire circumferential direction line symmetrically with respect to the tire equator and are arranged offset in the tire circumferential direction between one side and the other side in the tire width direction, and
the main groove and the sub groove include, per one pitch of pattern on one side in the tire width direction within the contact region during straight running, two or more outward grooves extending obliquely from the tire equator side to the outside in the tire width direction toward the designated reverse rotation direction of the rotation direction and one or more inward grooves extending obliquely from the outside in the tire width direction to the tire equator side toward the designated reverse rotation direction of the rotation direction,
wherein the first groove is connected to the second groove and the third groove is connected to the second groove so as to form the main groove continuously,
wherein the angle $\theta_1$ on the acute angle side formed by the extending direction of the first groove and the tire circumferential direction is 21 to 40 degrees, the angle $\theta_2$ on the acute angle side formed by the extending direction of the second groove and the tire circumferential direction is 20 to 40 degrees, and the angle $\theta_S$ on the acute angle side formed by the extending direction of a portion included in a contact region during straight running in the sub groove and the tire circumferential direction is 20 to 40 degrees.

2. The motorcycle tire according to claim 1, wherein the main groove and the sub groove include two or more of the outward grooves and one or more of the inward grooves in a contact surface that is grounded during straight running at any part in the tire circumferential direction.

3. The motorcycle tire according to claim 1, wherein the first groove is an inward groove of the one or more of the inward grooves, the sub groove is an outward groove of the two or more outward grooves, the ratio [(length of an overlapped portion in the circumferential direction (mm)/ length of the first groove in the tire circumferential direction (mm))×100(%)] of the overlapping portion in the tire circumferential direction between the first groove and the sub groove in the length of the first groove is 25 to 75%.

4. The motorcycle tire according to claim 1, wherein the arrangement pitch of the main groove and sub groove is 1/20 to 1/30 of the entire circumferential length of the tire.

* * * * *